United States Patent [19]

Furukawa et al.

[11] 4,378,414

[45] Mar. 29, 1983

[54] ZINC ALKALINE SECONDARY BATTERY

[75] Inventors: Nobuhiro Furukawa; Nobuyoshi Nishizawa, both of Hirakata, Japan

[73] Assignee: Sanyo Electric Co., Ltd., Osaka, Japan

[21] Appl. No.: 313,824

[22] Filed: Oct. 22, 1981

[30] Foreign Application Priority Data

May 30, 1981 [JP]  Japan .................................. 56-82821

[51] Int. Cl.³ ........................................... H01M 10/24
[52] U.S. Cl. ................................... 429/144; 429/206; 429/229
[58] Field of Search ............... 429/144, 145, 204, 229, 429/248

[56]  References Cited

U.S. PATENT DOCUMENTS 3,669,746  6/1972  Devitt et al. .................... 429/145 X
3,753,784  8/1973  Eisenacher et al. ................ 429/145
3,764,387  10/1973  Stark ................................... 429/145

*Primary Examiner*—Anthony Skapars
*Attorney, Agent, or Firm*—Hubbell, Cohen, Stiefel & Gross

[57]  ABSTRACT

A zinc alkaline secondary battery with improved service life in which a multi-layer separator is interposed between the negative and positive electrodes and the quantity of the alkaline electrolyte in the layer of the separator adjacent to the negative electrode is less than that of the electrolyte in the layer of the separator adjacent to the positive electrode.

6 Claims, 2 Drawing Figures

ZINC ALKALINE SECONDARY BATTERY

BACKGROUND OF THE INVENTION

1. Field of the Invention

This invention relates to a zinc alkaline secondary battery such as the nickel-zinc secondary battery or silver-zinc secondary battery in which zinc is used as the negative active material. More particularly, it relates to a zinc alkaline secondary battery having an improved service life in which a multi-layer separator is set between the positive electrode and the negative electrode and a quantity of an alkaline electrolyte to be absorbed and retained in the layer of the separator adjacent to the negative electrode is less than that in the layer of the separator adjacent to the positive electrode.

2. Description of the Prior Art

In recent years, remarkable dissemination of portable electronic and electric devices has come to accelerate rapid replacement of primary dry cells by secondary batteries, especially nickel-cadmium secondary batteries. As a more capable version of such secondary batteries, the zinc alkaline secondary battery are drawing keen attention. The zinc alkaline secondary battery enjoys various advantages such as high energy density per weight, high and stable operating voltages, good low-temperature requirements and superiority on economy and safety, but shows a disadvantage that its service life, namely the charge-discharge cycle life is short.

This disadvantage is believed to be caused basically by the reason that zinc on the surface of the negative electrode is dissolved as zincate ion into the electrolyte during the discharge. While, during the charge, this zincate ion forms dendritic zinc or readily shedding mossy zinc on the surface of the negative electrode, which results in short circuit between the negative electrode and the positive electrode or deformation of the negative electrode and consequently in a lowering of the service life of the battery. Further, the formation of the zincate ion during the discharge lowers a concentration of zinc in the surface part of the negative electrode, which results in a difference between zinc concentration of the surface part and that of the inner part, and an increase of a binder concentration and a lowering of the electroconductivity or the electrolyte content at the surface part.

It is known to use a limited quantity of electrolyte because the formation of zincate ion is accelerated in the presence of an excess quantity of electrolyte (21st Power Source Symposium, 1967, p 70–73). Also, it is known to use a first layer adjacent to the negative zinc electrode which is more retentive of electrolyte than in a second layer adjacent to the positive electrode (U.S. Pat. No. 3,669,746).

Under such circumstances, the inventors of this invention have studied to overcome the above disadvantages of the zinc alkaline secondary battery and found that the cycle life can be improved when a quantity of electrolyte is limited to the extent sufficient to accomodate electrochemical conduction between the electrodes and does not have substantially free electrolyte in the battery case, and a quantity of the electrolyte absorbed and retained by the layer of the separator adjacent to the zinc electrode is less than that of the positive electrode.

SUMMARY OF THE INVENTION

This invention provides a zinc alkaline secondary battery comprising at least one pair of a positive electrode and a zinc negative electrode, a multi-layer separator interposed between and in contact with said negative and positive electrodes and an alkaline electrolyte absorbed and retained by said multi-layer separator and said both electrodes being in the quantity which is limited to the extent that substantially no free electrolyte is present in the battery case but is sufficient to accomodate electrochemical conduction between the electrodes and in which a quantity ($mg/cm^2$) of the electrolyte absorbed and retained by the layer of the separator adjacent to the negative electrode is less than that by the layer of the separator adjacent to the positive electrode.

The quantity ($mg/cm^2$) of the alkaline electrolyte in the multi-layer separator as used in the specification will be explained in the example as described hereinafter.

The quantities of the electrolyte in the respective layers adjacent to the positive and negative electrodes in accordance with the invention are quite reverse to those in the abovementioned U.S. Pat. No. 3,669,746. The zinc alkaline secondary battery of the invention possesses an improved life cycle.

DETAILED DESCRIPTION OF THE PREFERRED EMBODIMENTS

Figure 1:
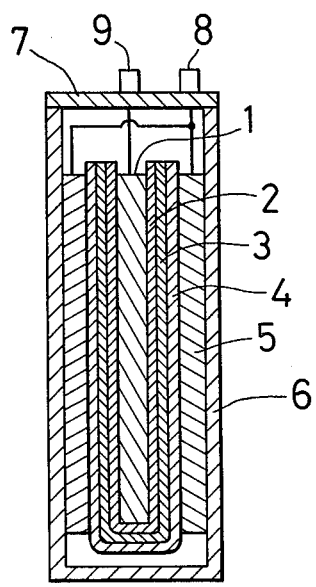
FIG. 1 is a longitudinal view of a zinc alkaline secondary battery as one embodiment of the invention and FIG. 2 is a plane view of a test piece of a separator material used for determining the quantity of electrolyte which is absorbed and retained in the separator material.
Figure 2:
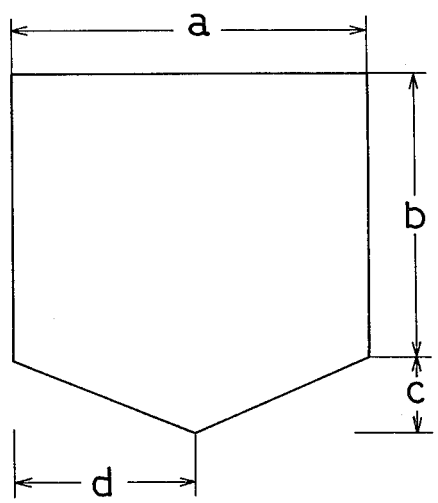

The multi-layer separators to be used in this invention are composed of at least two layers, preferably three or more layers.

One requirement of this invention that the quantity ($mg/cm^2$) of the alkaline electrolyte in the layer of the separator adjacent to the negative electrode is less than that of the layer adjacent to the positive electrode can be achieved, for example, as follows.

When both of the layers are made from a material which can absorb and retain the same quantity of the electrolyte in a certain specific thickness, the thickness of the layer adjacent to the negative electrode shall be smaller than that of the layer to the positive electrode.

Or when both of the layers have the same thickness, the quantity in the layer adjacent to the negative electrode shall be less than that of the layer to the positive electrode, provided that the both layers are made from two kinds of materials, each of which is different in the quantity to be able to absorb and retain in a certain specific thickness.

Further, when the multi-layer separator is composed of three or more layers, the quantity of the electrolyte in each of the layers is desirably increased at the order of the layers from the negative electrode to the positive electrode.

When the multi-layer separator is composed by four or more even-numbered layers, the layers may be alternately the same one (in material, quality, thickness and capacity to absorb and retain the electrolyte).

The quantity of the electrolyte in the layer adjacent to the negative electrode may be preferred to be form 1.0 to 10.0 mg/cm², while the quantity of the electrolyte in the layer adjacent to the positive may be 11.0 or more mg/cm².

Examples of the separators employed in the invention are porous polyolefin films such as polyethylene film or polypropylene film, or films thereof on the surface of which is graft-polymerized with acrylic acid or the like. Further examples are cellophane sheet, various filter papers or nonwoven fabrics made from pulp, rayon and/or synthetic fibers such as fibers of polyamides, polyesters, polyolefines or polyvinyl alcohols.

The separator of the invention is piled up, interposed between the negative and positive electrodes, pressed under an appropriate pressure, and put in the battery case in accordance with conventional assembly manners in the art. Then, an appropriate quantity of alkaline electrolyte is poured into the case and absorbed and retained in the separator and the electrodes, in the quantity as explained above.

Any electrodes employed in conventional zinc alkaline secondary batteries may be used as the electrodes of the invention.

As the electrolyte for use in the secondary battery of the present invention, there can be adopted an aqueous solution of potassium hydroxide or sodium hydroxide, etc. The concentration of the solute in the aqueous solution is desired to fall in the range of from 5 to 10 normals, preferable from 7 to 9 normals. The electrolyte further contains zinc oxide in an amount up to the level of saturation. Additional incorporation in the electrolyte of such a metal compound as lithium hydroxide [Li(OH)], indium hydroxide [In(OH)$_3$)], trilead tetraoxide (Pb$_3$O$_4$), bismuth hydroxide [Bi(OH)$_3$], thallium oxide (Tl$_2$O$_3$), tellurium dioxide (TeO$_2$) or stannous chloride (SnCl$_2$) or such an organic compound as quaternary amine, gelatine or peptone has an effect of inhibiting the occurrence of dendritic zinc with added efficiency.

The zinc alkaline secondary battery of the present invention has a very long cycle life, and thus has a very high industrial value. It is a highly useful power source for electronic calculators, radio sets, television sets, tape recorders, powerful lights, electronic flashes, electric shavers, video tape recorders, 8-mm motion picture cameras, etc.

Referring to FIG. 1, 1 is a negative electrode, 2, 3 and 4 each is a separator and they form three layers separator. Further 5 is a positive electrode, 6 is a battery case, 7 is a battery case cover, and 8 and 9 are terminals for the positive and negative electrodes, respectively.

Now, the present invention will be described specifically with reference to working examples, which are not limitative of this invention in any sense.

EXAMPLES 1–9, COMPARATIVE EXAMPLES 1–4

As the electrodes there are adopted the electrodes of the type used in ordinary zinc alkaline secondary battery. Namely, the negative electrode was made from 80% by weight of zinc oxide powder, 10% by weight of zinc powder, 5% by weight of cadmium oxide powder and 5% by weight of polytetrafluoroethylene dispersion in a usual manner and a sintered nickel electrode was adopted as the positive electrode. An aqueous 9 N potassium hydroxide solution containing zinc oxide powder in a concentration of 1 M was used as the electrolyte.

The multi-layer separators used are shown in Table 1 and the relationship of separator numbers and the kinds of the separators is shown in Table 2. The zinc alkaline secondary batterys were manufactured by using various multi-layer separators as shown in Table 1 and their cycle lifes were determined, which were described in Table 1.

Under the charge-discharge conditions which involved charging at 150 mA for six hours and discharging at 150 mA for varied periods required for the battery voltage to reach 1.3 V, the zinc alkaline secondary batteries as described in Table 1 were tested for cycle characteristic, which was shown in Table 1 as the number of cycle when the battery capacity decreased to the value of 75% of its initial value.

The quantities of the electrolyte absorbed and retained by various separators were determined by the following method and the results were shown in Table 2.

Quantity of the electrolyte absorbed and retained by separator

A test piece as shown in Table 2 (a=15.0 cm, b=12.0 cm, c=3.0 cm and d=7.5 cm; 202.5 cm²) was prepared from a sample material of a separator. After the separator reached moisture equilibrium state, it was weighed (Wg).

The test piece was dipped in spread form into aqueous potassium hydroxide solution having a specific gravity of 1.30 at the temperature of 20° C. After the electrolyte having sufficiently been absorbed (one or more hours), the test piece was taken up from the electrolyte. After ten minutes, the resulting test piece was weighed (W$_1$g) and the quantity of the electrolyte was calculated from the following equation.

$$\text{Quantity of electrolyte (g)} = W_1 - W$$

$$\text{Quantity of electrolyte (mg/cm}^2\text{)} = \frac{W_1 - W}{202.5} \times 1000$$

It is clearly indicated that the zinc alkaline secondary battery having an excellent cycle characteristic, namely greater number of cycle can be obtained by making the quantity of the electrolyte in the separator in contact with the negative electrode less than that in the separator in contact with the positive electrode.

TABLE 1

| | Multi-layer separator | |
|---|---|---|
| | Multi-layer separator Negative electrode ←→ Positive electrode | Service life (number of cycle) |
| Example 1 | *1 - 6 | 180 |
| Example 2 | 2 - 9 | 180 |
| Example 3 | 10 - 2 - 7 | 200 |
| Example 4 | 11 - 4 - 8 | 200 |
| Example 5 | 11 - 3 - 12 | 200 |
| Example 6 | 10 - 1 - 7 | 250 |
| Example 7 | 10 - 5 - 13 | 220 |
| Example 8 | 1 - 6 - 1 - 7 - 1 - 9 | 300 |
| Example 9 | 4 - 6 - 4 - 7 - 4 - 9 | 280 |
| Comparative example 1 | 6 - 1 | 140 |
| Comparative example 2 | 9 - 2 | 140 |
| Comparative example 3 | 7 - 1 - 10 | 150 |
| Comparative | | |

TABLE 1-continued

| | Multi-layer separator | |
|---|---|---|
| | Multi-layer separator Negative electrode ← → Positive electrode | Service life (number of cycle) |
| example 4 | 13 - 5 - 10 | 170 |

*(No. indicates the No. of the separator in Table 2)

TABLE 2

| No. of separator | Name | Thickness (mm) | Quantity of electrolyte (g) | Quantity of electrolyte (mg/cm²) |
|---|---|---|---|---|
| 1 | Porous PP film | 0.025 | 0.60 | 3.0 |
| 2 | Porous PE film | 0.050 | 0.70 | 3.5 |
| 3 | " | 0.050 | 0.45 | 2.2 |
| 4 | Porous PE film graft-polymerized with acrylic acid | 0.030 | 0.38 | 1.9 |
| 5 | Cellophane | 0.035 | 2.00 | 9.9 |
| 6 | Nylon non-woven fabric | 0.12 | 2.80 | 13.8 |
| 7 | " | 0.15 | 4.20 | 20.7 |
| 8 | " | 0.20 | 5.60 | 27.7 |
| 9 | " | 0.22 | 6.10 | 30.1 |
| 10 | PP non-woven fabric | 0.06 | 0.48 | 2.4 |
| 11 | " | 0.08 | 0.94 | 4.6 |
| 12 | " | 0.24 | 4.20 | 20.7 |
| 13 | " | 0.20 | 4.50 | 22.2 |

What is claimed is:

1. A zinc alkaline secondary battery comprising at least one pair of a positive electrode and a zinc negative electrode, a multi-layer separator interposed between and in contact with said negative and positive electrodes and an alkaline electrolyte absorbed and retained by said multi-layer separator and said both electrodes being in the quantity which is limited to the extent that substantially no free electrolyte is present in the battery case but is sufficient to accomodate electrochemical conduction between the electrodes and in which a quantity (mg/cm²) of the electrolyte absorbed and retained by the layer of the separator adjacent to the negative electrode is less than that by the layer of the separator adjacent to the positive electrode.

2. A zinc alkaline secondary battery as claimed in claim 1 in which a thickness of the layer of the separator adjacent to the negative electrode is smaller than that of the layer of the separator adjacent to the positive electrode, provided that both layers are made from a material which absorbs and retains the same quantity (mg/cm²) of the alkaline electrolyte in a certain specific thickness.

3. A zinc alkaline secondary battery as claimed in claim 1 in which a thickness of the layer of the separator adjacent to the negative electrode is equal to that of the layer of the separator adjacent to the positive electrode and the quantity (mg/cm²) of the alkaline electrolyte absorbed and retained by the former layer is less than that of the alkaline electrolyte absorbed and retained by the latter layer, provided that the said former and latter layers are made from two kinds of materials, each of which is different in quantity (mg/cm²) to be able to absorb and retain in a certain specific thickness.

4. A zinc alkaline secondary battery as claimed in claim 1 in which the multi-layer separator is composed of at least three layers which absorb and retain the alkaline electrolyte in the increasing quantity (mg/cm²) at the order of the layers from the negative electrode to the positive electrode.

5. A zinc alkaline secondary battery as claimed in claim 1 in which the multi-layer separator is composed of four or more even-numbered layers which are alternately the same.

6. A zinc alkaline secondary battery as claimed in claim 1 in which when the aqueous potassium hydroxide solution having a specific gravity of 1.30 at 20° C. is used as the alkaline electrolyte, the quantity of the electrolyte absorbed and retained by the layer of the separator adjacent to the negative electrode is 1.0 to 10.0 mg/cm² and that by the layer of the separator adjacent to the positive electrode is 11.0 or more mg/cm².

* * * * *